United States Patent
Huang et al.

(10) Patent No.: US 10,611,104 B2
(45) Date of Patent: Apr. 7, 2020

(54) HEATING ELEMENTS FOR REPAIR OF MOLDING DEFECTS FOR CARBON FIBER THERMOPLASTIC COMPOSITES

(71) Applicant: GM Global Technology Operations LLC, Detroit, MI (US)

(72) Inventors: Xiaosong Huang, Novi, MI (US); Hamid G. Kia, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 15/624,240

(22) Filed: Jun. 15, 2017

(65) Prior Publication Data

US 2018/0361690 A1 Dec. 20, 2018

(51) Int. Cl.
*B29C 65/00* (2006.01)
*B29C 65/70* (2006.01)
(Continued)

(52) U.S. Cl.
CPC .............. *B29C 73/12* (2013.01); *B29C 43/18* (2013.01); *B29C 43/222* (2013.01); *B29C 43/32* (2013.01);
(Continued)

(58) Field of Classification Search
CPC ......... B29C 65/00; B29C 65/02; B29C 65/18; B29C 65/22; B29C 65/221; B29C 65/224;
(Continued)

(56) References Cited

U.S. PATENT DOCUMENTS 3,837,965 A 9/1974 Mahon et al.
4,409,270 A 10/1983 Faber et al.
(Continued)

FOREIGN PATENT DOCUMENTS

CN 1258247 A 6/2000
CN 101535823 A 9/2009
(Continued)

OTHER PUBLICATIONS

First Office Action for Chinese Patent Application No. 201710079859.X dated Aug. 28, 2018 with correspondence dated Aug. 31, 2018 from China Patent Agent (H.K.) Ltd. summarizing contents, 12 pages.
(Continued)

*Primary Examiner* — Philip C Tucker
*Assistant Examiner* — Brian R Slawski
(74) *Attorney, Agent, or Firm* — Harness, Dickey & Pierce, P.L.C.

(57) ABSTRACT

Methods of repairing a manufacturing defect in a molded polymeric composite structure are provided. A polymeric patch may optionally be disposed over a defect on a first contoured surface of the molded polymeric composite structure having the defect. A heating element that defines a second contoured surface complementary with at least a portion of the first contoured surface is applied over the polymeric patch. The heating element includes an electrically conductive layer that includes a fabric and a thermoset polymer. The polymeric patch is heated with the heating element, where the heating element has a substantially uniform temperature across the second contoured surface so that the polymeric patch fills the defect. Methods of making the customized heating elements and the customized heating elements are also provided.

19 Claims, 7 Drawing Sheets

(51) Int. Cl.
| | | |
|---|---|---|
| *B29C 73/12* | (2006.01) | |
| *B29C 65/22* | (2006.01) | |
| *B29C 73/34* | (2006.01) | |
| *B29C 43/02* | (2006.01) | |
| *B29C 35/02* | (2006.01) | |
| *B29C 35/08* | (2006.01) | |
| *B32B 37/00* | (2006.01) | |
| *B32B 27/12* | (2006.01) | |
| *H05B 3/36* | (2006.01) | |
| *H05B 3/18* | (2006.01) | |
| *H05B 3/38* | (2006.01) | |
| *B29C 73/30* | (2006.01) | |
| *B29C 43/18* | (2006.01) | |
| *B29C 43/32* | (2006.01) | |
| *B29C 43/22* | (2006.01) | |
| *B29C 43/52* | (2006.01) | |
| *B29K 105/06* | (2006.01) | |

(52) U.S. Cl.
CPC .......... *B29C 65/22* (2013.01); *B29C 66/8122* (2013.01); *B29C 66/81262* (2013.01); *B29C 73/30* (2013.01); *B29C 73/34* (2013.01); *B29C 43/52* (2013.01); *B29C 65/70* (2013.01); *B29C 66/301* (2013.01); *B29C 66/721* (2013.01); *B29C 66/73921* (2013.01); *B29C 2035/0811* (2013.01); *B29K 2105/06* (2013.01); *B29K 2883/00* (2013.01); *B32B 27/12* (2013.01)

(58) Field of Classification Search
CPC ....... B29C 65/70; B29C 66/00; B29C 66/301; B29C 66/71; B29C 66/721; B29C 66/73921; B29C 73/00; B29C 73/04; B29C 73/10; B29C 73/12; B29C 73/24; B29C 73/30; B29C 73/34; B29C 2035/0211; B29C 73/105; B29C 2035/0811; B29C 43/00; B29C 43/003; B29C 43/02; B29C 43/021; H05B 2203/017; H05B 3/20; H05B 3/34; H05B 3/36; H05B 3/342; H05B 3/18; H05B 3/14; H05B 3/145; H05B 3/146; H05B 3/38; B32B 27/12
USPC ..... 156/60, 94, 98, 182, 196, 212, 228, 242, 156/245, 272.2, 272.4, 273.7, 273.9, 156/275.7, 293, 297, 298, 299, 308.2, 156/309.6; 264/239, 240, 241, 257, 258, 264/299, 319, 320, 330, 331.11, 294, 264/36.1, 36.18; 427/140; 428/63, 172, 428/297.4, 300.7, 301.4
See application file for complete search history.

(56) References Cited

U.S. PATENT DOCUMENTS

| | | | |
|---|---|---|---|
| 4,434,832 A | 3/1984 | Koch et al. | |
| 4,472,473 A | 9/1984 | Davis et al. | |
| 4,485,135 A | 11/1984 | Koch | |
| 4,865,674 A | 9/1989 | Durkin | |
| 4,948,443 A | 8/1990 | Speer | |
| 5,024,818 A | 6/1991 | Tibbetts et al. | |
| 5,829,716 A | 11/1998 | Kirkwood et al. | |
| 5,833,795 A | 11/1998 | Smith et al. | |
| 5,853,865 A | 12/1998 | McHugh et al. | |
| 6,039,824 A | 3/2000 | Van Haandel | |
| 6,200,686 B1 | 3/2001 | Ozaki et al. | |
| 6,206,067 B1 | 3/2001 | Kociemba et al. | |
| 6,468,372 B2 | 10/2002 | Kociemba et al. | |
| 6,781,099 B2 | 8/2004 | Krah | |
| 6,843,945 B1 | 1/2005 | Lee et al. | |
| 6,872,294 B2 | 3/2005 | Lee et al. | |
| 6,875,471 B2 | 4/2005 | Lee et al. | |
| 6,911,169 B2 | 6/2005 | Kwag et al. | |
| 7,846,366 B2 | 12/2010 | Iobst et al. | |
| 7,981,501 B2 | 7/2011 | Kwag et al. | |
| 8,043,543 B2 | 10/2011 | Wang et al. | |
| 8,309,644 B1 | 11/2012 | Huang | |
| 8,449,810 B2 | 5/2013 | Rousseau | |
| 8,475,884 B2 | 7/2013 | Kia | |
| 8,486,321 B2 | 7/2013 | Kia | |
| 8,545,650 B2 | 10/2013 | Evens et al. | |
| 8,597,562 B2 | 12/2013 | Wang et al. | |
| 8,641,957 B2 | 2/2014 | Atkins et al. | |
| 8,668,247 B2 | 3/2014 | Kia et al. | |
| 8,814,255 B2 | 8/2014 | Yamaji et al. | |
| 8,840,827 B2 | 9/2014 | Iobst et al. | |
| 8,852,733 B2 | 10/2014 | Kwag et al. | |
| 8,882,183 B2 | 11/2014 | Suzuki et al. | |
| 8,946,342 B2 | 2/2015 | Konagai et al. | |
| 8,991,900 B2 | 3/2015 | Yamaji et al. | |
| 9,017,499 B2 | 4/2015 | Evens et al. | |
| 9,054,387 B2 | 6/2015 | Viavattine et al. | |
| 9,132,859 B2 | 9/2015 | Yamaji et al. | |
| 9,475,238 B2 | 10/2016 | Suhara et al. | |
| 9,878,502 B2 | 1/2018 | Helfrich et al. | |
| 10,160,172 B2 | 12/2018 | Huang et al. | |
| 2004/0131769 A1 | 7/2004 | Saxon | |
| 2006/0057335 A1 | 3/2006 | Wang et al. | |
| 2006/0148590 A1 | 7/2006 | Sullivan et al. | |
| 2006/0158001 A1 | 7/2006 | Emch et al. | |
| 2008/0128078 A1 | 6/2008 | May et al. | |
| 2010/0136866 A1 | 6/2010 | Kwag et al. | |
| 2011/0021737 A1 | 1/2011 | Tadepalli et al. | |
| 2012/0107509 A1 | 5/2012 | Scherzer et al. | |
| 2012/0211144 A1 | 8/2012 | Litzenberger et al. | |
| 2012/0213997 A1 | 8/2012 | Wang et al. | |
| 2013/0089733 A1 | 4/2013 | Raghavan et al. | |
| 2013/0122262 A1 | 5/2013 | Nagakura et al. | |
| 2013/0149501 A1 | 6/2013 | Pacchione et al. | |
| 2013/0272780 A1 | 10/2013 | Takeuchi et al. | |
| 2013/0309001 A1 | 11/2013 | Teshima et al. | |
| 2013/0344282 A1 | 12/2013 | Yagi et al. | |
| 2014/0004308 A1 | 1/2014 | Taniguchi et al. | |
| 2014/0039114 A1 | 2/2014 | Hagihara et al. | |
| 2015/0001768 A1* | 1/2015 | Kia | B29C 73/30 264/484 |
| 2015/0108793 A1 | 4/2015 | Peschansky et al. | |
| 2015/0328847 A1 | 11/2015 | Kia et al. | |
| 2016/0039157 A1 | 2/2016 | Huang et al. | |
| 2017/0001389 A1 | 1/2017 | Engel et al. | |
| 2017/0066200 A1 | 3/2017 | Zhang et al. | |
| 2017/0203524 A1 | 7/2017 | Huang et al. | |
| 2017/0305044 A1* | 10/2017 | Terasaka | B29C 73/12 |
| 2017/0313002 A1 | 11/2017 | Huang et al. | |

FOREIGN PATENT DOCUMENTS

| | | |
|---|---|---|
| CN | 102574329 A | 7/2012 |
| CN | 102574339 A | 7/2012 |
| CN | 104275811 A | 1/2015 |
| CN | 105365232 A | 3/2016 |
| CN | 106976256 A | 7/2017 |
| CN | 107336449 A | 11/2017 |
| CN | 109109348 A | 1/2019 |
| DE | 4019744 A1 | 1/1992 |
| DE | 102005011977 A1 | 2/2006 |
| DE | 102007026099 A1 | 12/2008 |
| DE | 102011014017 A1 | 9/2012 |
| DE | 102011076463 A1 | 11/2012 |
| DE | 102012207468 A1 | 11/2013 |
| DE | 102013112933 A1 | 5/2015 |
| DE | 102015112874 A1 | 2/2016 |
| DE | 102015008312 A1 | 1/2017 |
| DE | 102017100509 A1 | 7/2017 |
| DE | 102013004232 B4 | 8/2017 |
| DE | 102017109362 A1 | 11/2017 |
| DE | 102016115284 A1 | 2/2018 |
| DE | 102018114194 A1 | 12/2018 |
| EP | 1755871 A2 | 2/2007 |

(56) References Cited

FOREIGN PATENT DOCUMENTS

| | | | |
|---|---|---|---|
| FR | 2742691 A1 | 6/1997 | |
| FR | 2981882 A1 * | 5/2013 | ............. B29C 70/44 |
| FR | 3050684 A1 | 11/2017 | |
| JP | S58191123 A | 11/1983 | |
| JP | S59223784 A | 12/1984 | |
| JP | 2000143743 A | 5/2000 | |
| JP | 2002511030 A | 4/2002 | |
| JP | 3294808 B2 | 6/2002 | |
| JP | 2002294160 A | 10/2002 | |
| JP | 20061125 A | 1/2006 | |
| JP | 2009143985 A | 7/2009 | |
| JP | 2010137527 A | 6/2010 | |
| JP | 2013503763 A | 2/2013 | |
| JP | 2013512808 A | 4/2013 | |
| JP | 2013525949 A | 6/2013 | |
| JP | 2014188995 A | 10/2014 | |
| JP | 2017141437 A | 8/2017 | |
| JP | 2017206685 A | 11/2017 | |
| WO | WO-1994012338 A1 | 6/1994 | |
| WO | WO-2008036786 A2 | 3/2008 | |
| WO | WO-2012102315 A1 | 8/2012 | |
| WO | WO-2012105080 A1 | 8/2012 | |
| WO | WO-2012105387 A1 | 8/2012 | |
| WO | WO-2012105389 A1 | 8/2012 | |
| WO | WO-2012105716 A1 | 8/2012 | |
| WO | WO-2012105717 A1 | 8/2012 | |
| WO | WO-2012108446 A1 | 8/2012 | |
| WO | WO-2012117593 A1 | 9/2012 | |
| WO | WO-2012140793 A1 | 10/2012 | |
| WO | WO-2013113676 A2 | 8/2013 | |
| WO | WO-2015087905 A1 | 6/2015 | |
| WO | WO-2016084861 A1 * | 6/2016 | ............. B29C 73/12 |

OTHER PUBLICATIONS

First Office Action and Search Report for Japanese Application No. 2017-091003 dated Oct. 2, 2018 with English language machine translation; 12 pages.

Preliminary Search Report for French Application No. 1753836 dated Mar. 4, 2019 with correspondence from Regimbeau European Patent and Trademark Attorneys dated Mar. 20, 2019 summarizing contents, 11 pages.

First Office Action in German Application No. 102017100509.9 from the German Patent Office dated Nov. 27, 2017 and correspondence from Manitz, Finsterwald & Partner summarizing the First Office Action; 6 pages.

First Office Action in German Application No. 102017109362.1 from the German Patent Office dated Mar. 22, 2018 and correspondence from Manitz, Finsterwald & Partner summarizing the First Office Action; 5 pages.

Notification of Reasons for Refusal and First Search Report in Japanese Application No. 2017-003799 from the Japanese Patent Office dated Feb. 1, 2018; 15 pages.

First Office Action for Chinese Patent Application No. 201710292244.5 dated Dec. 3, 2018 with correspondence dated Dec. 11, 2018 from China Patent Agent (H.K.) Ltd. summarizing contents, 11 pages.

He, Z., Satarkar, N., Xie, T., Cheng, Y.-T. and Hilt, J. Z.; "Remote Controlled Multishape Polymer Nanocomposites with Selective Radiofrequency Actuations"; Adv. Mater., 23; 2011; pp. 3192-3196.

A First Office Action in German Application No. 102015112874.8 from the German Patent Office dated Sep. 8, 2016 and correspondence from Manitz, Finsterwald & Partner summarizing the First Office Action; 5 pages.

A First Office Action in Chinese Application No. 201510601690.0 from the Chinese Patent Office dated Mar. 30, 2017; 17 pages.

Huang et al.; U.S. Appl. No. 15/144,625, filed May 2, 2016 entitled "Cosmetic Repair of a Thermoplastic Carbon Fiber Composite"; 44 pages.

First Office Action for German Patent Application No. 102018114194.7 dated May 15, 2019 with correspondence dated May 24, 2019 from Manitz Finsterwald and Partner summarizing contents, 6 pages.

* cited by examiner

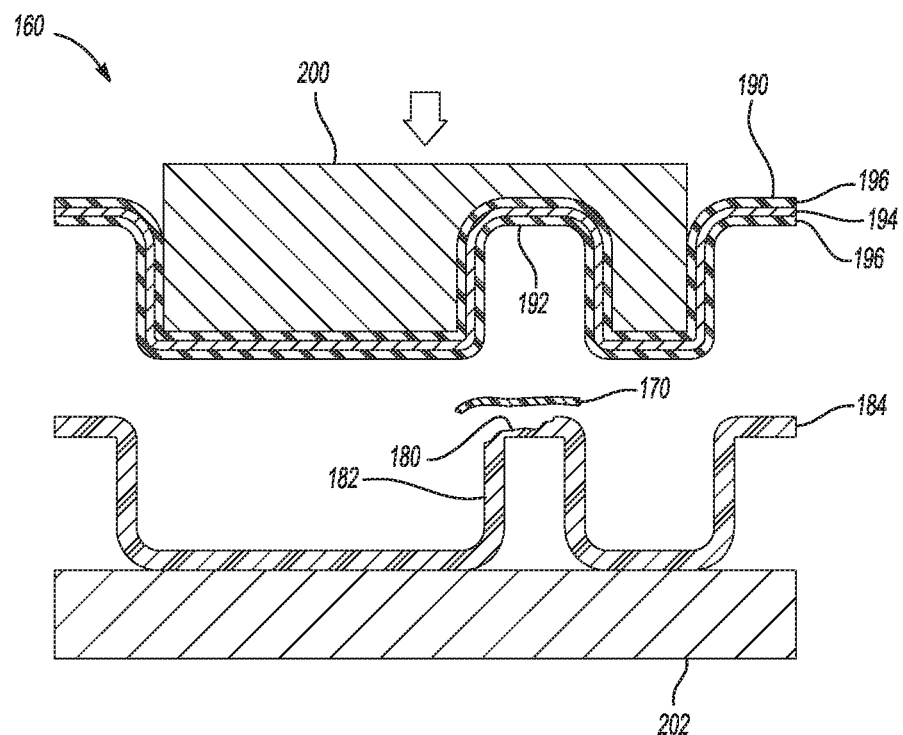
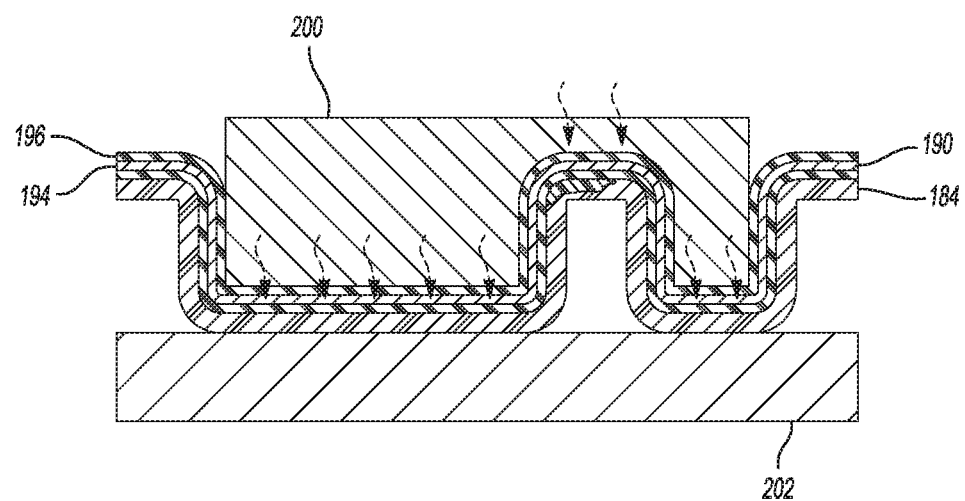
Fig-5

HEATING ELEMENTS FOR REPAIR OF MOLDING DEFECTS FOR CARBON FIBER THERMOPLASTIC COMPOSITES

This section provides background information related to the present disclosure which is not necessarily prior art.

The present disclosure relates to customized heating elements for repairing molding defects for composite materials, methods of repairing molding defects, and methods of forming the customized heating elements.

Polymeric composites are widely used in vehicles, such as automobiles, motorcycles, boats, tractors, buses, campers, mobile homes, and tanks, by way of non-limiting example. Reinforced composites are particularly suitable for use in components of an automobile or other vehicle (e.g., motorcycles, boats), but may also be used in a variety of other industries and applications, including aerospace components, industrial equipment and machinery, farm equipment, heavy machinery, by way of non-limiting example. For example, reinforced composites may be used to form automotive structural components having contoured or complex three-dimensional shapes. Non-limiting examples include structural panels, underbody shields, door panels, interior floors, floor pans (e.g., of a cargo van), roofs, exterior surfaces, gas tank protection shields, storage areas, including glove boxes, console boxes, trunks, trunk floors, truck beds, and the like.

When polymeric composite materials, including a resin or polymer and at least one reinforcement material, such as carbon or glass fibers, are molded to form parts having three-dimensional complex shapes, potential cosmetic/structural issues can arise in regions having sharp radii or complex contours. Issues in the molded part can also arise due to inappropriate blank positioning, for example, during compression molding or from trapped air during molding. Compared to metal materials, polymeric composites require different repair methods to correct such manufacturing issues. In fact, manufacturing defects in polymeric composite materials may not be capable of being repaired in a cost efficient and timely manner and are often scrapped as rejected waste. Therefore, the development of effective repair methods for manufactured polymeric composite structures is needed.

SUMMARY

This section provides a general summary of the disclosure, and is not a comprehensive disclosure of its full scope or all of its features.

In certain aspects, the present disclosure provides a method of repairing a manufacturing defect in a molded polymeric composite structure. The method may include applying a heating element over a first contoured surface of the molded polymeric composite structure including one or more defects. The heating element defines a second contoured surface complementary with at least a portion of a first contoured surface. The heating element also includes an electrically conductive layer including a fabric and a thermoset polymer. The method further includes heating a portion of the first contoured surface with the heating element. The heating element has a substantially uniform temperature across the second contoured surface and repairs the one or more defects.

In one aspect, the method further includes disposing a polymeric patch over a defect on a first contoured surface of the molded polymeric composite structure prior to the applying, so that the heating facilitates filling of the one or more defects with the polymeric patch material.

In one further aspect, the molded polymeric composite structure includes a thermoplastic polymer and a reinforcement material and the polymeric patch is a polymeric composite also including the thermoplastic polymer and the reinforcement material.

In one further aspect, the polymeric patch includes a polymeric composite having the same polymeric matrix as the polymeric composite structure and optionally the same reinforcing material as the polymeric composite structure.

In one further aspect, the heating of the polymeric patch with the heating element is to a maximum temperature that is less than or equal to about 50° C. above a melting point of the polymeric composite structure.

In one further aspect, the polymeric patch and the molded polymeric composite structure each include a thermoplastic polymer individually selected from the group consisting of: polyamides, polyester, polyolefin, polyurethane, poly(acrylic acid), poly(methyl acrylate), poly(methyl methacrylate), acrylonitrile butadiene styrene, polybenzimidazole, polylactic acid, polycarbonate, polyether sulfone, polyetherether ketone, polyetherimide, polyethylene, polyphenylene oxide, polyphenylene sulfide, polypropylene, polystyrene, polyvinyl chloride, polytetrafluoroethylene, and co-polymers and combinations thereof, and the molded polymeric composite structure further includes a reinforcement material selected from the group consisting of: carbon fibers, glass fibers, basalt fibers, aramid fibers, boron fibers, ceramic fibers, polyester fibers, ultra-high molecular weight polyethylene fibers, hemp fibers, and combinations thereof.

In one aspect, the temperature across the second contoured surface varies less than or equal to about 15° C.

In one aspect, the second contoured surface has a textured surface that corresponds to a texture of the first contoured surface.

In one aspect, the heating element further includes a pair of terminal connected to an external power source, so that the heating is a resistive heating process.

In one aspect, the heating element is part of an assembly including an induction heater, so that the heating is an inductive heating process.

In one aspect, the method further includes compression molding a composite blank to form the molded polymeric composite structure having the one or more defects prior to the applying.

In certain aspects, the present disclosure provides a heating element for repairing a defect in a molded polymeric composite structure. The heating element including an electrically conductive layer including a fabric and a thermoset polymer. The electrically conductive layer defines a contoured surface complementary with at least a portion of a corresponding surface of the molded polymeric composite structure including the defect. The heating element is capable of maintaining a substantially uniform temperature across the contoured surface.

In one aspect, the fabric is an electrically conductive fabric including a woven carbon fiber fabric or a resistance wire fabric.

In one aspect, the contoured surface defines a textured surface.

In one aspect, the heating element further includes a pair of terminals in electrical communication with the electrically conductive layer.

In one aspect, the thermoset polymer includes a siloxane elastomer.

In one aspect, the electrically conductive layer includes an electrically conductive composite including the siloxane elastomer and an electrically conductive filler distributed therein.

In yet other aspects, the present disclosure provides a method of forming a heating element for repairing a manufacturing defect in a molded polymeric composite structure. The method includes disposing a fabric in a cavity of a template defining a contoured surface profile. A liquid precursor of thermoset polymer may also be introduced into the cavity so that the liquid precursor fills the fabric and contact a surface of the template. At least one of the liquid precursor or the fabric includes an electrically conductive material. The method further includes solidifying the liquid precursor to form the thermoset polymer. The thermoset polymer and the fabric together define the heating element having the contoured surface profile.

In one aspect, the fabric is an electrically conductive fabric including a woven carbon fiber fabric and the thermoset polymer includes a siloxane elastomer.

In one aspect, the liquid precursor further includes an electrically conductive filler and after the solidifying, an electrically conductive composite is formed including the siloxane elastomer and the electrically conductive filler.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 shows side sectional views of a process for repairing a complex three dimensionally shaped polymeric composite structure having one or more cosmetic defects with a customized heating element in an inductive heating process in accordance with certain aspects of the present disclosure.

Corresponding reference numerals indicate corresponding parts throughout the several views of the drawings.

DETAILED DESCRIPTION

Figure 1:
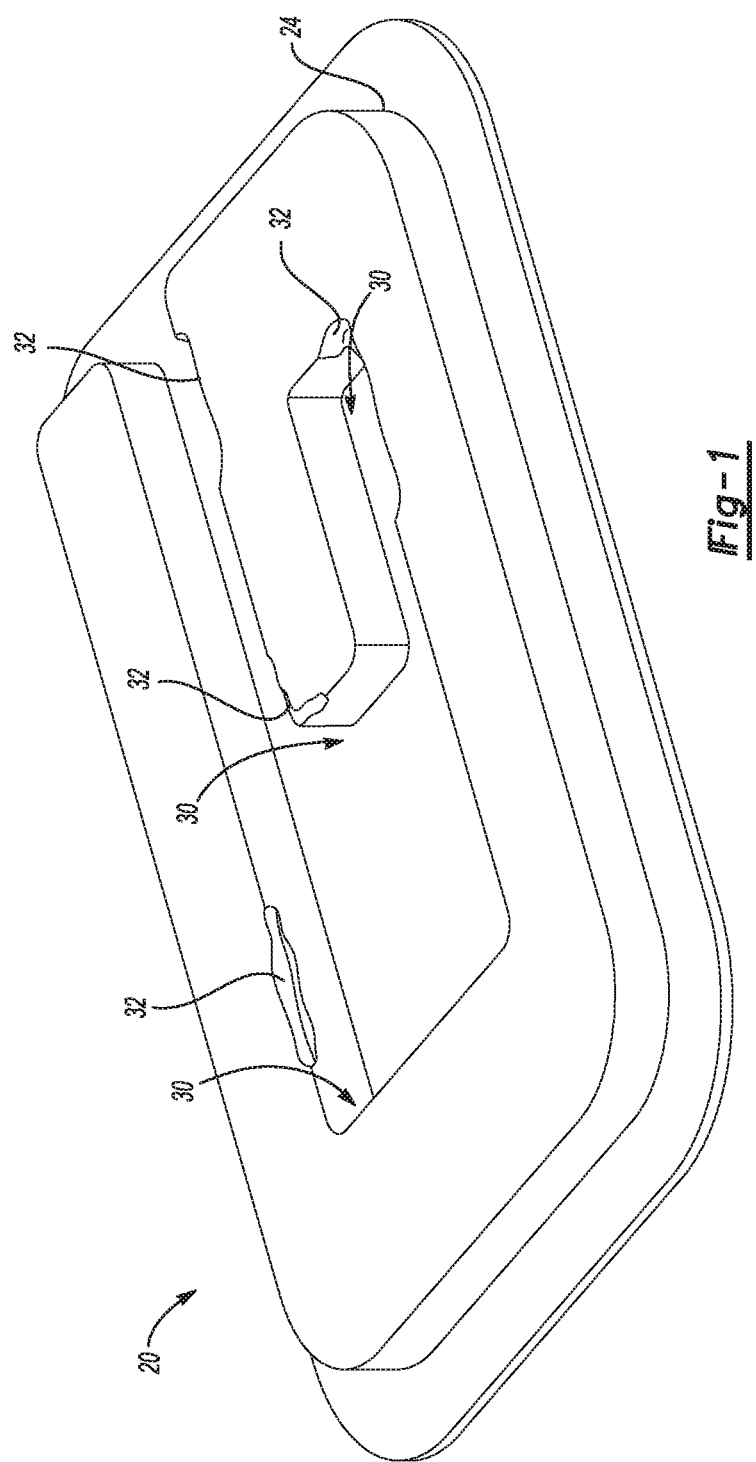
FIG. 1 shows a compression molded polymeric composite structure having a complex three dimensional shape with void regions where polymeric composite is absent.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In certain aspects, the present disclosure provides methods of repairing manufacturing defects in molded polymeric composite structures. Polymeric composites are widely used in vehicles, such as automobiles, motorcycles, boats, tractors, buses, mobile homes, campers, and tanks, and their utilization will be increasing in the future with efforts to further reduce vehicle mass. Reinforced composites are particularly suitable for use in components of an automobile or other vehicle (e.g., motorcycles, boats), but may also be used in a variety of other industries and applications, including aerospace components, industrial equipment and machinery, farm equipment, heavy machinery, by way of non-limiting example. For example, reinforced composites may be used to form automotive structural components having contoured or complex three-dimensional shapes. Non-limiting examples include gas tank protection shields, underbody shields, structural panels, door panels, interior floors, floor pans (e.g., of a cargo van), roofs, exterior surfaces, storage areas, including glove boxes, console boxes, trunks, trunk floors, truck beds, and the like. The polymeric composite material may be formed from or comprise a thermoplastic resin and a reinforcement filler. Reinforcement materials may be in the form of particulates, fibers, such as short fibers, long fibers, continuous fibers, whiskers, fabrics, and the like, or any combination thereof.

Compression molding is often used to form polymeric composite automotive parts, such as structural or load-carrying parts. Compression molding a polymeric composite component is typically conducted by disposing a polymeric composite blank in a mold cavity of a compression mold having at least two dies that together define the mold cavity. In certain variations, the compression mold and mold cavity are optionally pre-heated. Heat and pressure is applied to form a compression molded consolidated polymeric composite.

Molding issues, such as cosmetic or structural flaws or defects, may arise due to inappropriate blank positioning or trapped air or moisture during molding. Furthermore, where three-dimensional polymeric composite parts are molded having complex geometries and/or sharp radii in the curvature of the mold cavity shape, manufacturing cosmetic defects may arise where the resin fails to fully fill such regions. The manufacturing defects may be in a variety of forms, such as dents or missing void regions within the composite structure or regions that appear as fuzz where the reinforcement material in the composite is deficient in resin (so that the reinforcement materials, like fibers, appear as fuzzy regions). Other issues may include bubbles that arise from trapped air or moisture. The manufacturing defect can thus be cosmetic, such as a dent, pit, void, hole, groove, bump, or fuzzy region depleted of thermoplastic resin.

For cosmetic repairs, materials used to fill in such defects desirably have good adhesion with a polymeric composite structure to ensure repair durability and have a color and texture that match the color and texture of the polymeric composite.

The present disclosure pertains to methods for repairing manufacturing defects in polymeric composite structures. More specifically, in certain aspects, the present disclosure provides methods of cosmetically repairing the manufacturing defects arising from molding. Production rates can be improved when molding defects of thermoplastic composites can be readily fixed. However, challenges have arisen in repairing these cosmetic defects in composite parts having complex shapes with repair techniques like use of heat blankets. A heat blanket generally does not adequately cover the intricacies of the complex geometry composite structures and therefore cannot uniformly apply heat to all surfaces that are being repaired, which can result in additional cosmetic issues or weakness and potential damage to the composite structure. Overheating the surface can potentially damage the base composite material, while under-heating can leave the surface unrepaired, because adequate heating facilitates melting the repair/patch material and imprints the necessary surface texture. Thus, parts having simple geometries that may have manufacturing defects may be repaired by such heat blanket techniques. However, manufacturing defects arising on more complex three-dimensionally shaped parts occur more frequently (due to the complexity of the mold cavity shape) and can be significantly more challenging to repair.

FIG. 1 shows a three-dimensionally complex polymeric composite part 20 that includes both a polymer matrix and at least one reinforcing or filler material distributed therein. The polymer resin may be a thermoplastic polymer. By way of non-limiting example, the polymer may include: a polyamide resin (such as PA6, PA11, PA12, PA46, PA66, PA610, and caprolactam), vinyl ester, polyamide imide resin, polyimide resin, polyether imide resin, phenolic resins, bismaleimides, polyvinyl alcohol resin, vinyl chloride resin, vinylidene chloride resin, vinyl acetate resin, polystyrene resin, acrylonitrile styrene resin, acrylonitrile-butadiene-styrene resin, acrylic resin, methacrylate resin, polyethylene resin, polypropylene resin, polyphenylenesulfide resin, polybenzimidazole resin, polyacetal resin, polycarbonate resin, polyethylene terephthalate resin, polyethylene naphthalate resin, polybutylene terephthalate resin, polyacrylate resin, polyarylethersulfone resin, polyphenylene ether resin, polyphenylene sulfide resin, polysulfone resin, polyether sulfone resin, polyether ether ketone resin, polylactide resin, polycarbonate resin, and any combination or copolymers of these polymers.

In certain variations, the reinforcing or filler material may be a particle or fiber. Suitable non-limiting examples of fibers include carbon fibers, glass fibers (e.g., fiber glass or quartz), aramid fibers (e.g., KEVLAR® para-aramid synthetic fiber and TWARON® para-aramid synthetic fiber), boron fibers, ceramic fibers, polyester fibers, ultra-high molecular weight polyethylene (UHMWPE) fibers, hemp fibers, basalt fibers, and combinations thereof.

Suitable fibers may be continuous fibers or chopped fibers, including relatively short length fibers (e.g., having lengths from about 0.1 mm to about 10 mm), relatively long length fibers (e.g., having lengths of from about 10 mm to about 100 mm), or continuous fibers (e.g., having lengths of greater than or equal to about 100 mm), and may include any combinations thereof. In certain variations, the fibers may be provided as a fiber mat or fabric having interconnecting or contacting fibers. In other aspects, the fibers may be distributed (e.g., homogeneously distributed) throughout the resin matrix/polymer.

As appreciated by those of skill in the art, the reinforced polymeric composite material may further include other conventional ingredients, including other reinforcement materials, functional fillers or additive agents, like organic/inorganic fillers, fire-retardants, anti-ultraviolet radiation agents (UV stabilizers), anti-oxidants, colorants or pigments, such as carbon black powder, mold release agents, softeners, plasticizing agents, surface active agents, and the like. In regard to the colorants or pigments.

With renewed reference to FIG. 1, the polymeric composite part 20 has been compression molded and defines a body region 24 with a three-dimensional profile. The body region 24 includes various curved regions 30. Such a shape is considered to be complex for a compression molding process in that it defines one or more tight radii or complex contours in the curved regions 30. Thus, one or more cosmetic defects or voids 32 are formed in the body region 24 due to the curved regions 30, which may arise due to the molding process, trapped vapor or air, or misalignment of the dies during molding. Notably, the one or more cosmetic defects or voids 32 may also encompass defective surface textures, fuzz, or other cosmetic defects previously discussed above and are not limited to voids or missing material.

As noted above, in various aspects, the present disclosure can repair a defective surface texture or cosmetic void by using a customized heating element having a local textured mold that is designed to generate uniform heating on the part surface. In this manner, processes of cosmetically repairing molding or other manufacturing defects in a thermoplastic fiber composite part can improve production yield. In one aspect, the methods may include compression molding a composite blank to form the molded polymeric composite structure having a manufacturing defect.

The present disclosure thus provides a heating element for repairing a defect in a molded polymeric composite structure in certain aspects. The heating element includes an electrically conductive layer that defines a contoured surface complementary with at least a portion of a corresponding surface of the molded polymeric composite structure comprising a defect, so in this manner, the heating element is customized for the molded polymeric composite part. The electrically conductive layer includes a fabric and a thermoset polymer. The electrically conductive layer includes at least one electrically conductive material. For example, the fabric may be electrically conductive or the conductive layer may include an electrically conductive composite having the thermoset polymer and an electrically conductive material distributed therein. The heating element is capable of maintaining a substantially uniform temperature across the contoured surface of the molded polymeric composite structure.

The fabric is moldable and drapable, for example, pliable and flexible, and can be used to form the electrically conductive layer that conforms to opposing surface of the molded polymeric composite structure having the defect. A fabric may include felted, knitted, stitched, braided, woven, non-woven, crimped, and non-crimped materials, including cloth and mats. The fabric may be electrically conductive and formed from electrically conductive materials. Alternatively, the fabric may be non-conductive and formed from electrically non-conductive material, in which case, an electrically conductive material (e.g., conductive polymeric composite) may be dispersed within the openings of the non-conductive fabric. In certain aspects, the fabric is an electrically conductive fabric including carbon fibers or resistance wires. In certain variations, the electrically conductive fabric may be a woven carbon fiber fabric. In alternative aspects, a resistance wire fabric may be used as the electrically conductive fabric. The resistance wire fabric may be woven. An electrical resistance of the heating element is less than or equal to about 1,000 Ohm, optionally less than or equal to about 100 Ohm, and in certain variations, optionally less than or equal to about 10 Ohm.

In certain variations, a pair of terminals in electrical communication with the electrically conductive layer. Where the fabric is electrically conductive, the terminals may be in electrical communication with the electrically conductive fabric. Where an electrically conductive composite is included in the electrically conductive layer, the terminals may be in electrical communication with the electrically conductive composite. The terminals may be connected to one or more regions of the electrically conductive layer and to a power source that is used to establish apply voltage to the electrically conductive layer.

In certain aspects, the contoured surface of the layer that is complementary with at least a portion of a corresponding surface of the molded polymeric composite structure is a textured surface. A textured surface includes a visible pattern, for example, cross-hatching, a grain pattern, or other surface micro-patterns. In certain aspects, the textured surface is similar to or matches a surface texture of the polymeric composite structure, so that the contoured surface of the heating element imparts a texture over the repair that blends with other exposed regions of the surface of the polymeric composite structure.

The electrically conductive layer defines a contoured surface complementary with at least a portion of a corresponding surface of the molded polymeric composite structure also comprises a thermoset polymer. In certain variations, the precursor that forms the thermoset polymer is in a liquid form and has a viscosity such that it can permeate within openings and through the fabric structure. The precursor may optionally include an electrically conductive material distributed therein. After solidifying the precursor, the electrically conductive layer includes the solidified thermoset polymer distributed within the openings of the fabric and in certain aspects, defines the textured surface of the electrically conductive layer capable of imprinting a pattern on an opposing surface. The thermoset polymer can withstand relatively high heat levels generated by the heating element during repair to melt and/or soften a thermoplastic material. While the temperature may vary depending on the thermoplastic polymer in the molded polymeric composite structure and polymer in the repair material/patch, in certain aspects, the thermoset polymer can withstand a temperature of greater than or equal to about 250° C. In certain variations, the thermoset polymer comprises a siloxane, such as a siloxane elastomer.

In other variations, the electrically conductive layer of the heating element comprises an electrically conductive composite comprising a polymer, such a thermoset polymer like a siloxane elastomer, and an electrically conductive filler material distributed therein. Electrically conductive materials may include particles or fibers, such as carbon fibers, or particles of gold, silver, copper, nickel, carbon, graphene, platinum, and the like. The electrically conductive layer may include a non-conductive fabric or a conductive fabric in combination with an electrically conductive composite having the electrically conductive filler material distributed therein.

Figure 2:
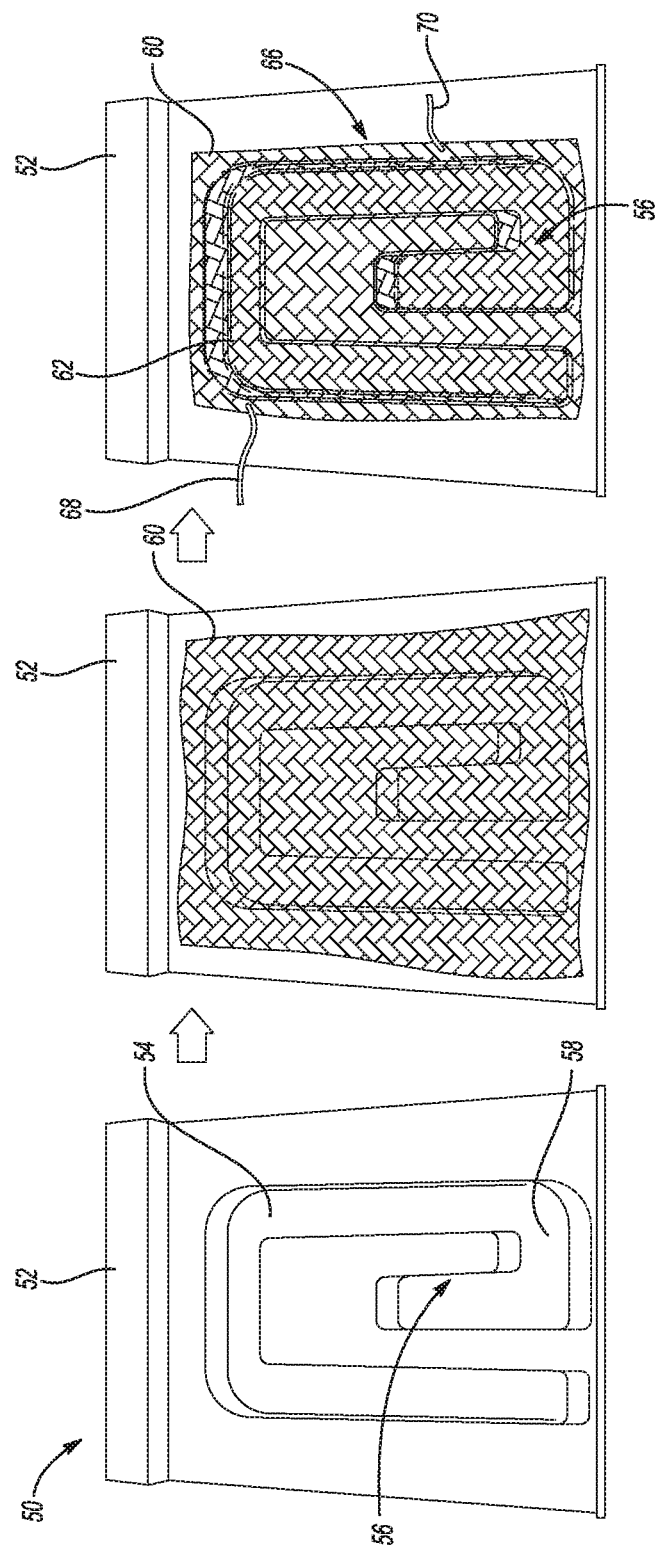
FIG. 2 shows a schematic of a process for forming a customized heating element prepared in accordance with certain aspects of the present disclosure for use in repairing complex three dimensionally shaped polymeric composite structures having one or more cosmetic defects.
Figure 3:
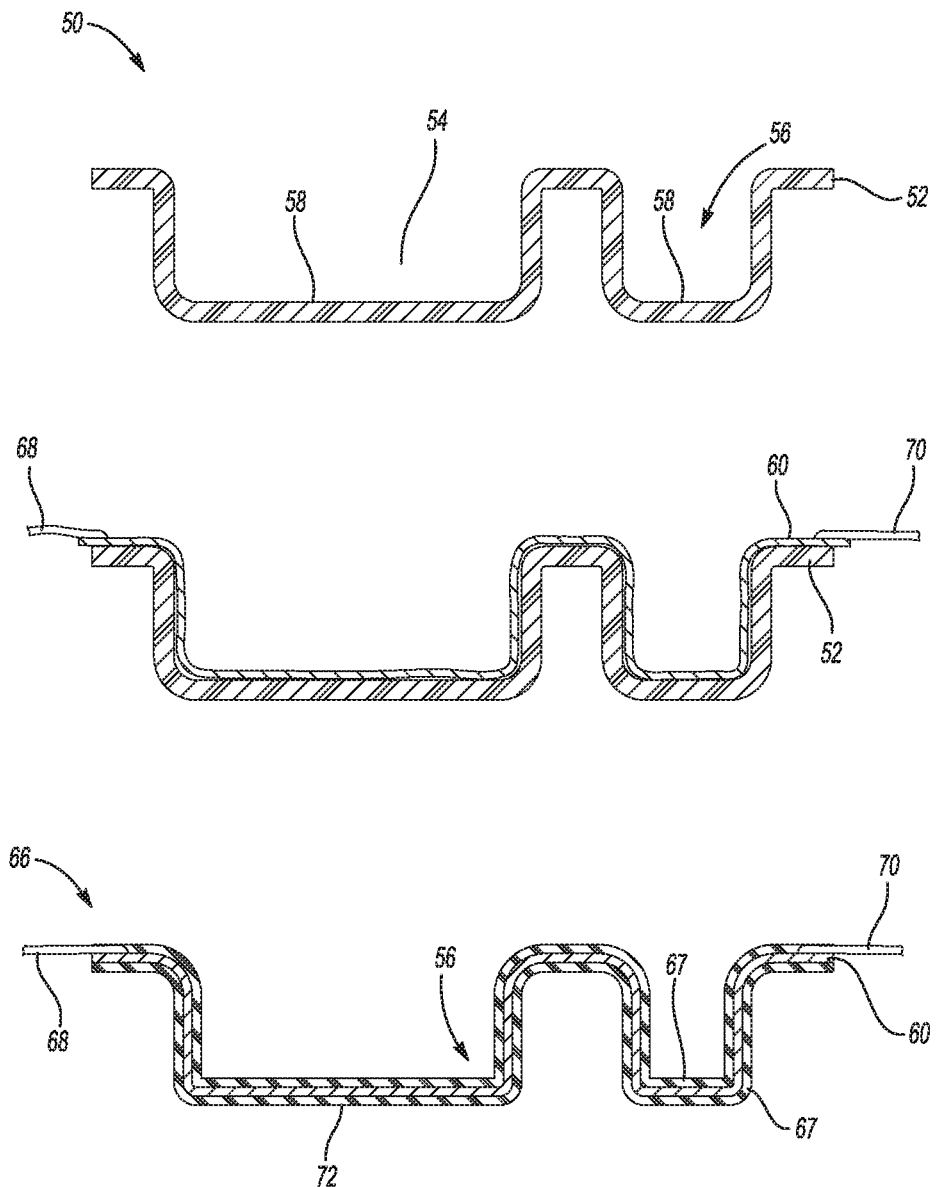
FIG. 3 shows side sectional views of the process for forming the customized heating element shown in FIG. 2.

The present disclosure contemplates a process 50 of forming a heating element for repairing a manufacturing defect in a molded polymeric composite structure is shown in FIGS. 2 and 3. A template 52 is provided that can be a molded polymeric composite structure substantially free of any defects. The template 52 thus defines a contoured surface profile 56 creating a complex three-dimensional shape 54. The contoured surface profile 56 will define an inverse shape of the molded polymeric composite structure. It should be noted that while not shown, in alternative aspects, the present disclosure also contemplates using an opposite or inverse side of a mold used to form a molded polymeric composite to define the inverse shape that will receive the molded polymeric structure having one or more defects. The method includes disposing an electrically conductive fabric 60 around the contoured surface profile 56 of the template 52 defining the complex three-dimensional shape 54. Next, a liquid precursor 62 of thermoset polymer is introduced into so that the liquid precursor 62 fills openings in the electrically conductive fabric 60 and flows through the electrically conductive fabric 60 to contact a surface 58 of the template 52.

Next, the liquid precursor 62 is solidified (e.g., by reaction or curing/cross-linking) to form a heating element 66 including a thermoset polymer 67 and the electrically conductive fabric 60, which together define the heating element 66 having the contoured surface profile. During the solidification process of the liquid precursor 62, the electrically conductive layer that is formed of the thermoset polymer 67 and electrically conductive fabric 60 defines a heating element 66 closely conforming to the contoured surface profile 56 of the template 52, so that when the heating element is removed, it retains the contoured surface profile 56. Notably, the electrically conductive layer may in fact include multiple distinct material layers and is not limited to a single layer. A thickness of the heating element 66 may be greater than or equal to about 0.001 mm to less than or equal to about 5 cm. In certain aspects, a thickness across different regions of the heating element 66 varies by a maximum of less than or equal to about 20%, optionally less than or equal to about 15%, and in certain variations, optionally less than or equal to about 10.

Further, the solidified thermoset polymer 67 defines a textured surface 72 by virtue of contact of the liquid precursor with the surface 58 of the template 52. In this manner, because the template 52 is used to compression mold the polymeric composite structure, it provides the same texture to the thermoset polymer in the heating element 66, so that the textured surface 72 will match the surface pattern of the molded polymeric composite structure serving as such a template 52.

As noted above, the electrically conductive fabric 60 may be any of those described above, for example, a woven carbon fiber fabric. The thermoset polymer 67 may be any of those described above, such as a siloxane elastomer. In certain variations, the liquid precursor 62 further includes an electrically conductive filler and after the solidifying, an electrically conductive composite is formed comprising the solidified thermoset polymer 67 (e.g., siloxane elastomer) and the electrically conductive filler. In this manner, electrical conductivity in the heating element 66 can be further enhanced. In alternative variations, the fabric may be non-conductive, but the precursor may include an electrically conductive material in addition to the thermoset polymer, so that an electrically conductive composite may be formed. Thus, in such variations, the liquid precursor 62 includes the electrically conductive material or filler and after the solidifying, an electrically conductive composite is formed including the solidified thermoset polymer 67 (e.g., siloxane elastomer) and electrically conductive filler. The fabric need not be electrically conductive.

As shown in FIG. 2, two terminals 68, 70 are connected to the electrically conductive fabric 60, which can be connected to leads of electrical conduits in electrical connection with an external power source (not shown in FIGS. 2 and 3).

Figure 4:
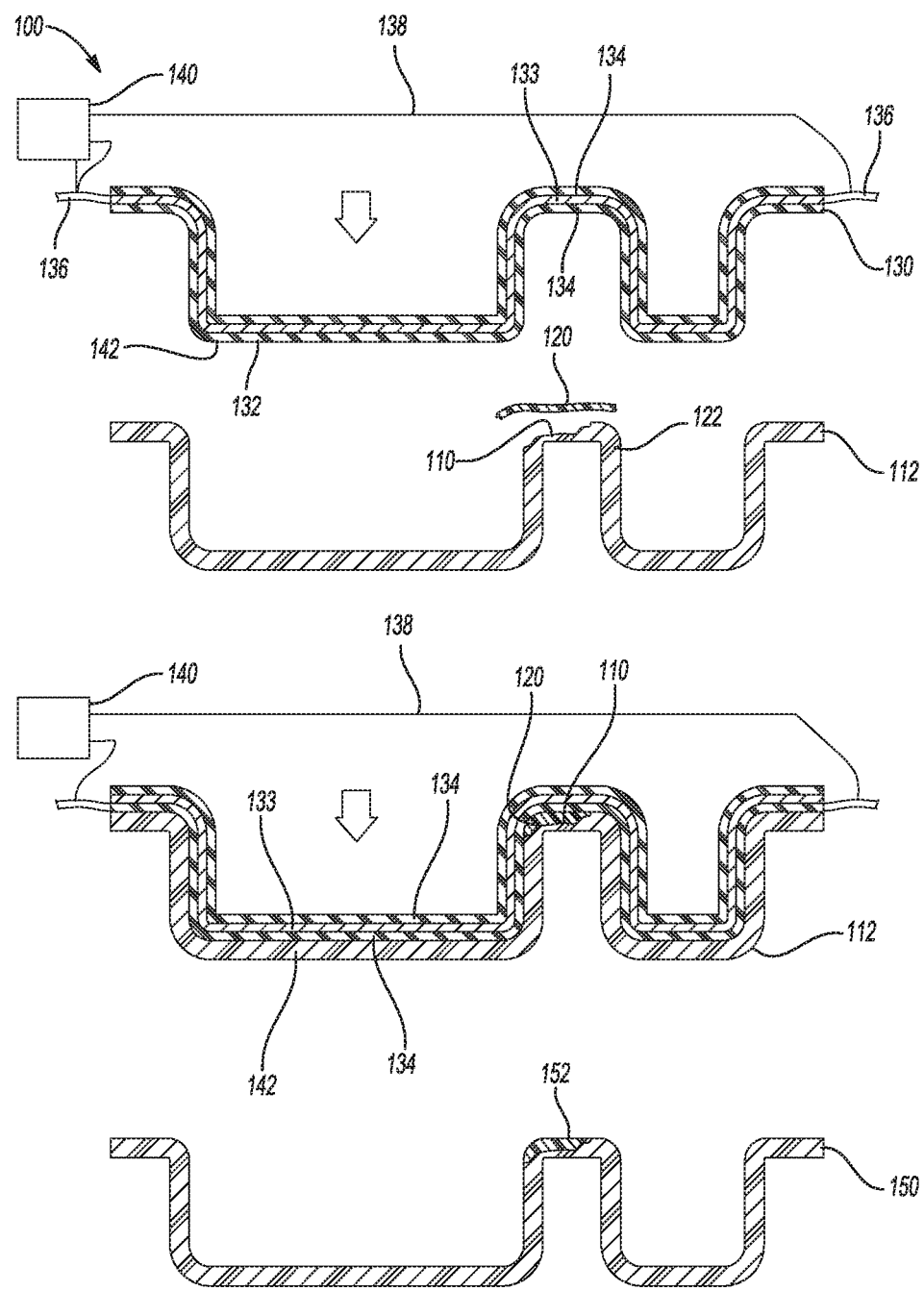
FIG. 4 shows a side sectional view of a repaired three dimensionally shaped polymeric composite structure having one or more repaired cosmetic defect regions repaired with a customized heating element like that shown in FIGS. 2 and 3 in a resistive heating process in accordance with certain aspects of the present disclosure.

In certain aspects, the present disclosure contemplates a method 100 of repairing a manufacturing defect 110 in a molded polymeric composite structure 112, such as that shown in FIG. 4. In certain aspects, the method optionally includes disposing a polymeric patch 120 over the defect 110 on a first contoured surface 122 of the molded polymeric composite structure 112. It should be noted that in other variations, a patch 120 need not be used, for example, where there is a minor flaw or scratch that can repaired by heating alone without need for additional material. When used, the patch 120 material may be composed of a thermoplastic polymer or a thermoplastic composite having a reinforcing material dispersed in a polymeric matrix or resin, which may be the same or different material as that forming the polymeric composite structure 112. In alternative variations, the polymer patch may be an uncured or unreacted thermoset. In certain variations, the molded polymeric composite structure 112 comprises a thermoplastic polymer and a reinforcement material and the polymeric patch 120 is a polymeric composite comprising the same thermoplastic polymer and the reinforcement material as the molded polymeric composite structure 112.

In certain aspects, the defect 110 may be at least partially filled with a filling material (not shown). When the defect is filled with a filling material, the patch 120 is disposed over the defect 110 after the filling material has hardened. The patch 120 can include a thermoplastic polymer. In certain variations, the patch 120 may be a polymeric composite patch having a polymer and a reinforcement material dispersed therein. The thermoplastic polymers in the patch 120 may be the same as those discussed above in the context of suitable materials for the polymeric composite. Hence, the polymeric patch 120 may have a composition that is the same as a composition of the polymeric composite structure 112, including having the same reinforcement material at the same levels (e.g., similar fiber content), or have a different polymer composite composition and/or fiber content as the polymeric composite structure 112. For example, the polymeric patch 120 may have a composition that is the same as a composition of the polymeric composite structure 112, but include a filler or fiber content that is less than the fiber content in the polymeric composite structure 112. In certain variations, suitable polymeric patch 120 materials include the same polymer matrix or resin as the polymeric composite structure 112, but may omit reinforcing materials (e.g., filler/fiber content).

The polymeric patch 120 may flow to fill the voids, while leaving a small amount of material in other areas so as to mask or blend into the polymeric composite structure 112. In certain aspects, the polymeric patch 120 may have a thickness of greater than or equal to about 1 μm to less than or equal to about 1 mm. In certain aspects, the polymeric patch 120 substantially matches the composition and/or color of the polymeric composite structure 112, such that after the repair is completed, the polymeric patch 120 covers the defect 110 and is only slightly visible or not visible at all.

A heating element 130 having a design similar to and formed in accordance with the process described in the context of FIGS. 2 and 3 has a second contoured surface 132 that is complementary with at least a portion of the first contoured surface 122 of the molded polymeric composite structure 112. The heating element 130 has an electrically conductive fabric 133 and a thermoset polymer 134, along with two terminals 136. The terminals 136 are in electrical connection with electrical conduits 138 and a power source 140. The heating element 130 can be used in a resistive heating process by applying current to the electrically conductive fabric 133.

The second contoured surface 132 has a textured surface 142 that corresponds to a texture of the first contoured surface 122. The second contoured surface 132 of the heating element 130 is disposed over and in contact with the polymeric patch 120. In accordance with various aspects of the present disclosure, the heating element 130 delivers a substantially uniform temperature across the second contoured surface 132, so that the polymeric patch 120 melts or softens to fill or smooth out the defect 110. The substantially uniform temperature generated across the second contoured surface 132 thus provides even heat to desired regions of the first contoured surface 122 of the molded polymeric composite structure 112.

As noted above, by applying even heat across the surface, both overheating and underheating are avoided. Overheating can potentially result in structural damage to the thermoplastic composite, while underheating may be ineffective at repairing the defect with the polymeric patch 120. As noted above, by substantially uniform temperature, it is meant that a temperature across the second contoured surface 132 of the heating element 130 varies less than or equal to about 15° C., optionally less than or equal to about 10° C., and in certain variations, optionally less than or equal to about 5° C.

The heating of the polymeric patch 120 with the heating element is to a maximum temperature that is less than or equal to about 50° C. above a melting point of the material forming the molded polymeric composite structure 112. In certain aspects, the maximum temperature is less than or equal to about 35° C. above a melting point of the polymeric composite material, optionally less than or equal to about 30° C. above a melting point of the polymeric composite material, optionally less than or equal to about 20° C. above a melting point of the polymeric composite material, optionally less than or equal to about 15° C. above a melting point of the polymeric composite material, and in certain variations, optionally less than or equal to about 10° C. above a melting point of the polymeric composite material. In certain aspects, the heating may be to an average maximum temperature of greater than or equal to about 150° C. to less than or equal to about 250° C., optionally greater than or equal to about 175° C. to less than or equal to about 250° C., optionally greater than or equal to about 200° C. to less than or equal to about 245° C., and in certain aspects, optionally greater than or equal to about 230° C. to less than or equal to about 245° C. The heating element and or heating assembly may include one or more thermocouples (not shown) or other devices for monitoring temperature in the system.

In certain aspects, in addition to heat, pressure may also be applied to the heating element 130 through the polymeric patch 120 and to the molded polymeric composite structure 112. While not shown, an optional insulating material can be disposed on one side of the heating element 130 to minimize heat transfer, for example, in embodiments where pressure is applied so as to reduce heating of the components applying pressure. An amount of pressure may be a standard atmospheric pressure of greater than or equal to about 0.001 MPa to less than or equal to about 50 MPa and optionally greater than or equal to about 0.005 MPa to less than or equal to about 1 MPa, to the source of heat 26. A source of pressure can be any known in the art, such as mechanical force (like vacuum bagging, sandbag, etc.) or magnetic force (such as with an electromagnet).

In various aspects, the present methods of repair can fill up the dents and/or cover a defective area on a molded polymeric composite structure with a repair material. Then, the heating element advantageously provides uniform heating on a surface of a complex geometry part that requires repair. Uniform heating on the surface of a complex geometry part can be achieved by using the electrically conductive fabric (e.g., patterning resistance cloth or resistance wires) having good drapability on the part surface and filling up the cloth openings with thermally conductive silicone rubber. In alternative variations, a uniform thickness conductive layer can be spray coated on the part surface. Then, heat and optionally pressure may be applied to the area to be repaired. Lastly, the assembly may be cooled to form the repaired molded polymeric composite structure. After conducting methods like 100 in FIG. 4, a repaired molded polymeric composite structure 150 is formed that has a repaired region 152 where the polymeric patch 120 filled the manufacturing defect 110. In certain aspects, the repaired region 152 is not visible or only slightly visible after the repair process is completed.

In another alternative process 160 shown in FIG. 5, an inductive heating process is used with a customized heating element for repairing a manufacturing defect in a molded polymeric composite structure. The method comprises disposing a polymeric patch 170 over the defect 180 on a first contoured surface 182 of the molded polymeric composite structure 184. The polymeric patch 170 and the polymeric composite 184 can be the same as those described previously above in the context of FIG. 4 (polymeric patch 120 and the polymeric composite 112).

In certain aspects, the defect 180 may be at least partially filled with a filling material (not shown). When the defect is filled with a filling material, the polymeric patch 170 is disposed over the defect 180 after the filling material has hardened. A heating element 190 has a second contoured surface 192 that is complementary with at least a portion of the first contoured surface 182 of the molded polymeric composite structure 184. The heating element 190 defines an electrically conductive layer including an electrically conductive fabric 194 and a thermoset polymer 196. An optional insulating material 200 can be disposed on one side of the heating element 190 to minimize heat transfer if contact on the backside of the heating element 190 is required, for example, in embodiments where pressure is applied. An induction heater 202 is disposed on one side of the heating element 190 on an opposite side of the polymeric composite structure 184, although it may be disposed on the other side of the assembly (e.g., on the side of the heating element 190 having the optional insulating material 200). The induction heater 202 is in electrical communication with an external power unit (e.g., having AC 120V) and when activated, the induction heater induces inductive heating within the electrically conductive fabric 194 (and optionally conductive composite distributed therein) within the heating element 190. The heating element 130 is thus part of an assembly including the induction heater 202, the polymeric patch 170, and the molded polymeric composite structure 184 therebetween, so that the heating is an inductive heating process. Again, the heating element 190 delivers a substantially uniform temperature across the second contoured surface 192, so that the polymeric patch 170 melts or softens to fill or smooth out the defect 180. The substantially uniform temperature generated across the second contoured surface 192 thus provides even heat to desired regions of the first contoured surface 182 of the molded polymeric composite structure 184. The substantially uniform temperature is the same as that described previously above. Further, pressure may also be applied during the inductive heating process, as described previously above. The heating element and or heating assembly may include one or more thermocouples (not shown) or other devices for monitoring temperature in the system.

Figure 6:
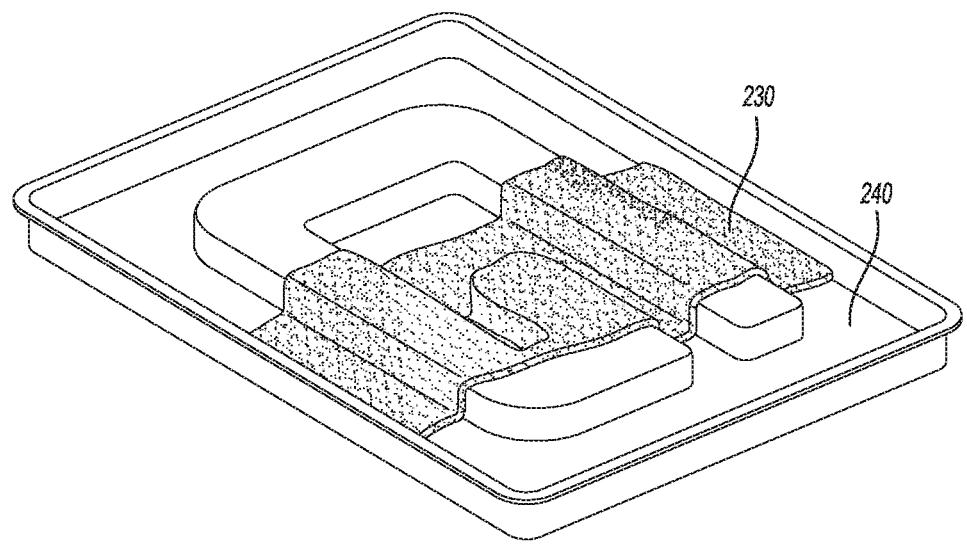
FIG. 6 shows a perspective view of another variation of a customized heating element prepared in accordance with certain aspects of the present disclosure for use in repairing complex three dimensionally shaped polymeric composite structures having one or more cosmetic defects.
Figure 7:
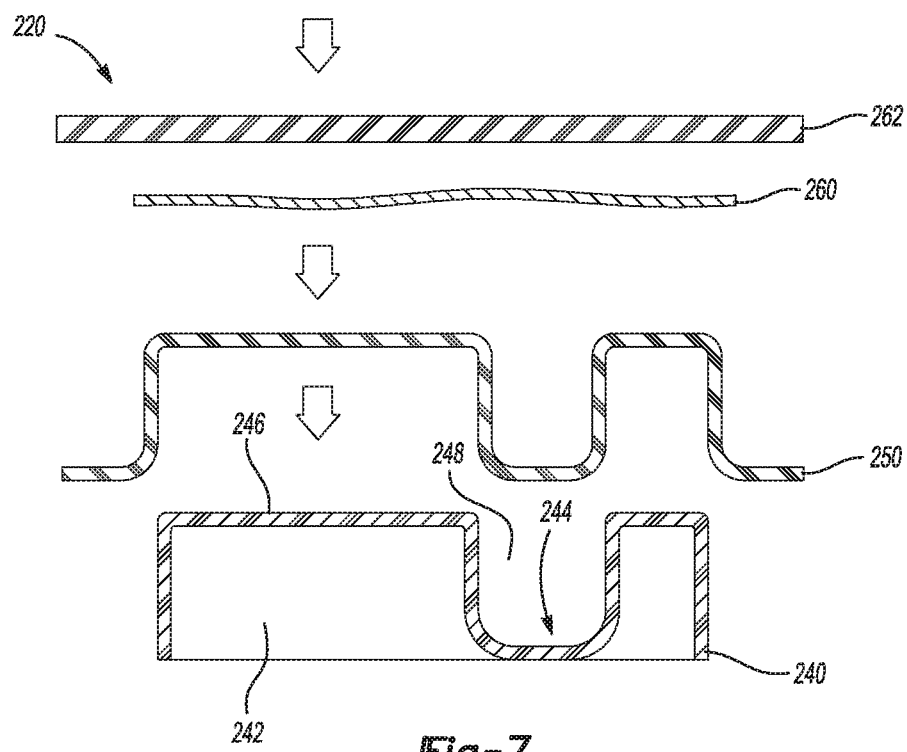
FIG. 7 shows a schematic of a process for forming a customized heating element like that shown in FIG. 6.

The present disclosure further contemplates another process 220 of forming an alternative heating element 230 that can be used to repair a manufacturing defect in a molded polymeric composite structure is shown in FIGS. 6 and 7. A template 240 is provided in the form of a molded polymeric composite structure that is substantially free of any defects. The template 240 defines a contoured surface profile 244 defines a complex three-dimensional shape including a textured surface 246 that will create a heating element 230 with an inverse shape to the molded polymeric composite structure to be repaired. In this method, a fabric 250 is provided. As discussed above, the wet fabric 250 may be non-conductive. A precursor of a thermoset heat-resistant polymer 260 is poured to fill openings in a fabric to create a wet fabric 250. Liquid polymer precursor flows through the fabric openings and contacts the textured surface 246. Excess liquid precursor is then removed. The wet fabric (including fabric 250 and precursor of a thermoset heat-resistant polymer 260) is disposed on the textured surface 246 and solidified (e.g., reacted and/or cured/cross-linked) over to adopt the contoured surface profile 244. The thermoset heat-resistant polymer 260 may be a conductive room temperature vulcanization (RTV) siloxane/silicone rubber. The RTV silicone rubber may be cured to provide a consistent thickness. The fabric 250 is present to assist with providing a uniform thickness for generation of a uniform heat profile.

A thickness of the thermoset heat-resistant polymer element may be greater than or equal to about 0.0001 mm to less than or equal to about 10 mm. In certain aspects, a thickness across different regions of the thermoset heat-resistant polymer layer varies by a maximum of less than or equal to about 20%, optionally less than or equal to about 15%, and in certain variations, optionally less than or equal to about 10%. The thermoset heat-resistant polymer contacts a surface along the textured surface 246 of the template 240. The thermoset heat-resistant polymer thus adopts a textured surface by virtue of contact of the liquid precursor with the textured surface 246 of the template 240. In this manner, because the template 240 is used to compression mold the polymeric composite structure, it provides a similar texture to the thermoset polymer in the heating element 230, so that the textured surface will match the surface pattern of a molded polymeric composite structure.

As noted above, the fabric 250 may be non-conductive or may be electrically conductive like any of those described above, for example, a woven carbon fiber fabric. The thermoset polymer may be any of those described above, such as a siloxane elastomer. In certain variations like those where the fabric 250 is electrically non-conductive, the liquid precursor 260 further includes an electrically conductive filler and after the solidifying, an electrically conductive composite is formed comprising the solidified thermoset polymer (e.g., siloxane elastomer) and the electrically conductive filler.

Figure 8:
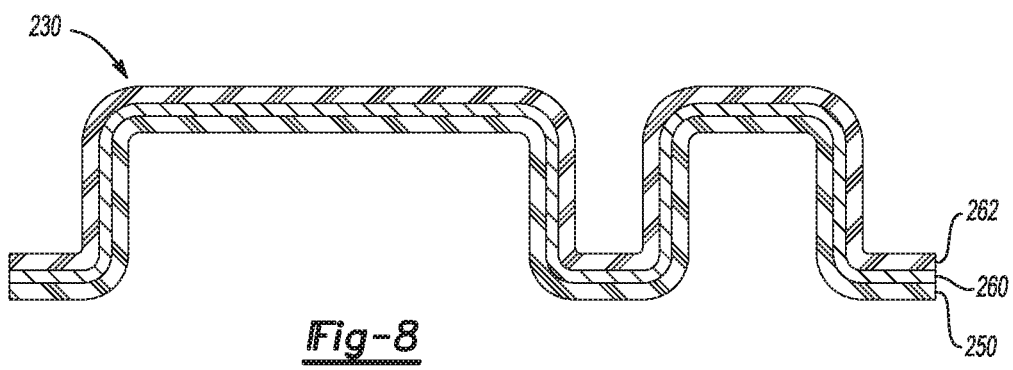
FIG. 8 shows a customized heating element formed by the process shown in FIG. 7.

After the liquid precursor is solidified (e.g., by reaction or curing/cross-linking), the thermoset heat-resistant polymer 260 and the fabric 250 together define the heating element 230 having the contoured surface profile 244 (see also, FIG. 8). After curing, an optional insulating material 262 may be introduced over the fabric 250 with solidified thermoset heat-resistant polymer 260.

In this manner, a molded polymeric composite structure having a defect can seat within the heating element 230 substituting in place of the template 240 shown in FIGS. 6 and 7. FIG. 8 shows the final heating element 230 that includes thermoset heat-resistant polymer 260, which is solidified within openings of the fabric 250 (and while shown as separate layers, may in fact be blended together in a single layer), and the optional insulating material 262. It should be noted that heating elements in any of the embodiments described in the context of the present disclosure need only define a portion of the surface of the template (corresponding to the molded polymeric composite part), although they may correspond to the entire surface of the complex three-dimensional shape. Thus, a heating element corresponding to a partial region of the complex three-dimensional shape (as shown in FIG. 6), which can be used to repair select regions where defects may more frequently occur.

Figure 9:
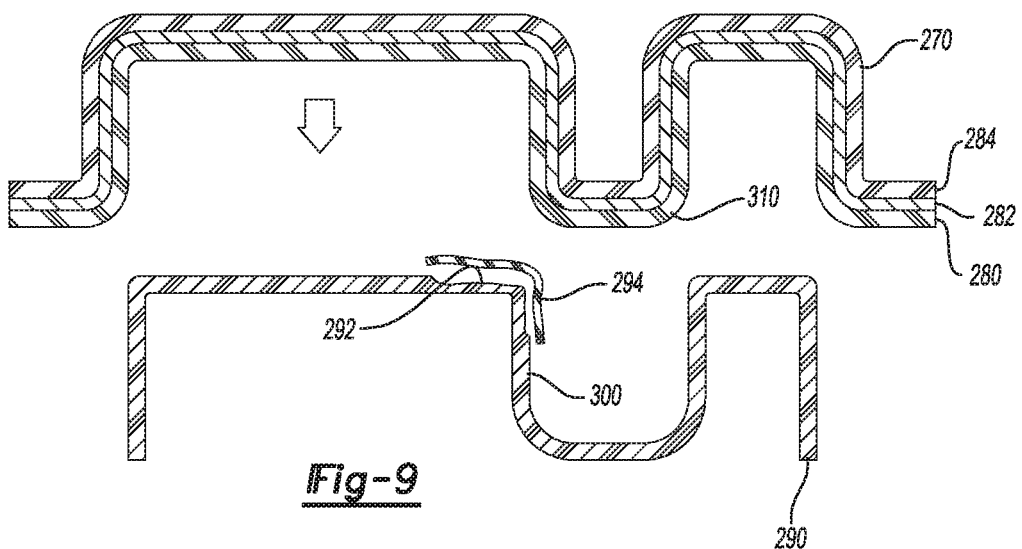
FIG. 9 shows side sectional views of a process for repairing a complex three dimensionally shaped polymeric composite structure having one or more cosmetic defects with a customized heating element in accordance with certain aspects of the present disclosure.

FIG. 9 shows a heating element 270 formed in accordance with a process and heating element formed in FIGS. 6-8. The heating element 270 includes a thermoset heat-resistant polymer 280, a fabric layer 282, and an insulating layer 284. The heating element 270 may be either a resistive heating system with terminals (not shown) or an inductive heating system with an inductive heater (not shown). A molded polymeric composite structure 290 has a manufacturing defect 292 and a thermoplastic polymer patch 294 disposed over the manufacturing defect 292. The molded polymeric composite structure 290 defines a first contoured surface 300.

Figure 10:
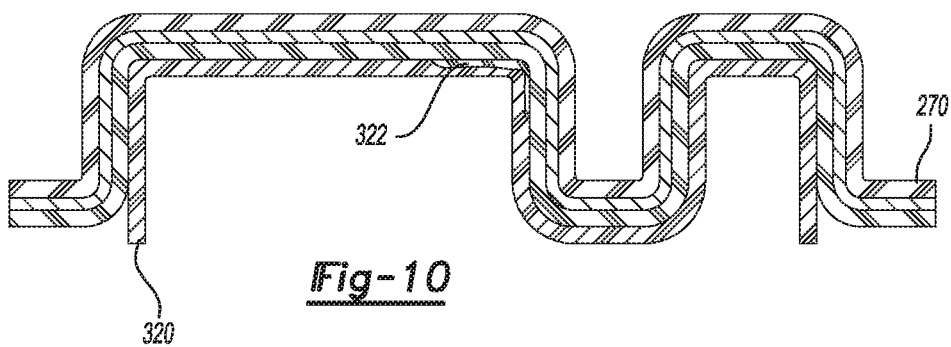
FIG. 10 shows a side sectional view of a repaired three dimensionally shaped polymeric composite structure having one or more repaired cosmetic defect regions repaired with a customized heating element by a process like that shown in FIG. 9 in accordance with certain aspects of the present disclosure.

The heating element 270 has a second contoured surface 310 that is complementary with at least a portion of the first contoured surface 300 of the molded polymeric composite structure 290. The second contoured surface 310 is textured so that is complementary to a texture of the first contoured surface 300. The second contoured surface 310 of the heating element 270 is disposed over and in contact with the polymeric patch 294. In accordance with various aspects of the present disclosure, the heating element 270 delivers a substantially uniform temperature across the second contoured surface 310, so that the polymeric patch 294 melts or softens to fill or smooth out the defect 292. As in the other embodiments, a substantially uniform temperature is generated across the second contoured surface 310 to provide even heat to desired regions of the first contoured surface 300 of the molded polymeric composite structure 290. In this manner, a customized heating element delivers uniform and even heat to provide a superior repaired In FIG. 10, a repaired molded polymeric composite structure 320 is formed that has a repaired region 322 where the polymeric patch 294 has filled the manufacturing defect 292. In certain aspects, the repaired region 322 is not visible or only slightly visible after the repair process is completed.

In various aspects, repaired regions of a repaired molded polymeric composite structure is desirably not visible. If a polymeric patch material is different than a base polymeric composite material, it will have a distinct matrix chemistry that can be differentiated using tools such as FTIR and NMR. Where the same resin is used in the repair or patch material (as the base polymeric composite material), the repair materials may have different carbon fiber loadings and carbon fiber geometries. Thus, acid digestion can be used to remove the resin in the repaired area, leaving only carbon fibers. The carbon fibers in the repair materials can then be measured for its physical dimensions, and the fiber content in this area can be calculated based on the measured resin and fiber masses to determine if a repaired region is present. Non-destructive evaluations (e.g. ultrasonic, radiographic, eddy-current testing, and the like) and X-ray can also be used for fiber dimension measurement.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of repairing a manufacturing defect in a molded polymeric composite structure, the method comprising:
    applying a heating element over a first contoured surface of the molded polymeric composite structure comprising a defect, wherein the heating element defines a second contoured surface complementary with at least a portion of the first contoured surface and the heating element comprises an electrically conductive layer including a fabric and a thermoset polymer; and
    heating a portion of the first contoured surface with the heating element, wherein the heating element has a substantially uniform temperature across the second contoured surface to repair the defect, wherein the heating element is molded and retains the second contoured surface prior to the applying.

2. The method of claim 1, further comprising disposing a polymeric patch over the defect on the first contoured surface of the molded polymeric composite structure prior to the applying.

3. The method of claim 2, wherein the molded polymeric composite structure comprises a thermoplastic polymer and a reinforcement material and the polymeric patch is a polymeric composite also comprising the thermoplastic polymer and the reinforcement material.

4. The method of claim 2, wherein the molded polymeric composite structure comprises a polymer matrix and a reinforcement material and the polymeric patch comprises a polymeric composite having the same polymer matrix as the molded polymeric composite structure and optionally the same reinforcement material as the molded polymeric composite structure.

5. The method of claim 2, wherein the heating of the portion of the first contoured surface comprises heating the polymeric patch to a maximum temperature that is less than or equal to about 50° C. above a melting point of the polymeric composite structure.

6. The method of claim 2, wherein the polymeric patch and the molded polymeric composite structure each comprise a thermoplastic polymer individually selected from the group consisting of: polyamides, polyester, polyolefin, polyurethane, poly(acrylic acid), poly(methyl acrylate), poly (methyl methacrylate), acrylonitrile butadiene styrene, polybenzimidazole, polylactic acid, polycarbonate, polyether sulfone, polyetherether ketone, polyetherimide, polyethylene, polyphenylene oxide, polyphenylene sulfide, polypropylene, polystyrene, polyvinyl chloride, polytetrafluoroethylene, and co-polymers and combinations thereof, and the molded polymeric composite structure further comprises a reinforcement material selected from the group consisting of: carbon fibers, glass fibers, basalt fibers, aramid fibers, boron fibers, ceramic fibers, polyester fibers, ultra-high molecular weight polyethylene fibers, hemp fibers, and combinations thereof.

7. The method of claim 1, wherein the substantially uniform temperature across the second contoured surface varies less than or equal to about 15° C.

8. The method of claim 1, wherein the second contoured surface has a textured surface that corresponds to a texture of the first contoured surface.

9. The method of claim 1, wherein the heating element further comprises a pair of terminals connected to an external power source, so that the heating is a resistive heating process.

10. The method of claim 1, wherein the heating element is part of an assembly comprising an induction heater, so that the heating is an inductive heating process.

11. The method of claim 1, further comprising compression molding a composite blank to form the molded polymeric composite structure having the defect prior to the applying.

12. The method of claim 1, wherein prior to the applying, the method comprises:
 disposing the fabric in a cavity of a template defining a contoured surface profile that is complementary with at least a portion of the first contoured surface;
 introducing a liquid precursor of a thermoset polymer into the cavity so that the liquid precursor fills the fabric, wherein at least one of the liquid precursor or the fabric comprises an electrically conductive material; and
 solidifying the liquid precursor to form the thermoset polymer, wherein the thermoset polymer and the fabric together define the heating element defining the second contoured surface.

13. The method of claim 12, wherein the fabric is an electrically conductive fabric comprising a woven carbon fiber fabric and the thermoset polymer comprises a siloxane elastomer.

14. The method of claim 13, wherein the liquid precursor further comprises an electrically conductive filler and after the solidifying, an electrically conductive composite is formed comprising the siloxane elastomer and the electrically conductive filler.

15. The method of claim 13, further comprising:
 removing the heating element from the template, wherein after the removing, the heating element retains the second contoured surface.

16. A method of repairing a manufacturing defect in a first contoured surface of a molded polymeric composite structure, the method comprising:
 obtaining a molded heating element having a retained second contoured surface that defines an inverse shape of the first contoured surface over the first contoured surface of the molded polymeric composite structure and that has an electrically conductive layer including a fabric and a thermoset polymer;
 applying the molded heating element over the defect on the first contoured surface of the molded polymeric composite structure; and
 applying a substantially uniform temperature across the retained second contoured surface of the molded heating element to heat a portion of the first contoured surface to repair the defect.

17. The method of claim 16, further comprising disposing a polymeric patch over the defect on the first contoured surface of the molded polymeric composite structure prior to the applying.

18. A method of repairing a manufacturing defect in a molded polymeric composite structure, the method comprising:
 disposing a fabric in a cavity of a template defining a contoured surface profile that is complementary with at least a portion of a first contoured surface of the molded polymeric composite structure comprising the defect;
 introducing a liquid precursor of a thermoset polymer into the cavity so that the liquid precursor fills the fabric, wherein at least one of the liquid precursor or the fabric comprises an electrically conductive material;
 solidifying the liquid precursor to form the thermoset polymer, wherein the thermoset polymer and the fabric together define a heating element defining a second contoured surface complementary with at least a portion of the first contoured surface;
 removing the heating element from the template, wherein the heating element retains the second contoured surface after the removing;
 applying the heating element over the first contoured surface of the molded polymeric composite structure comprising the defect; and
 heating a portion of the first contoured surface with the heating element, wherein the heating element has a substantially uniform temperature across the second contoured surface to repair the defect.

19. The method of claim 18, further comprising disposing a polymeric patch over the defect on the first contoured surface of the molded polymeric composite structure prior to the applying.

* * * * *